United States Patent Office 3,480,447
Patented Nov. 25, 1969

3,480,447
PRODUCTION OF SEASONINGS WITH A FLAVOR SIMILAR TO MEAT EXTRACT
Arthur W. Hack, Heilbronn, and Wolfgang Konigsdorf, Flein, near Heilbronn, Germany, assignors to Corn Products Company, New York, N.Y., a corporation of Delaware
No Drawing. Filed July 11, 1966, Ser. No. 564,018
Claims priority, application Germany, July 22, 1965, D 47,797
Int. Cl. A23l 1/22
U.S. Cl. 99—140          11 Claims

ABSTRACT OF THE DISCLOSURE

A process for the production of seasonings with a flavor similar to meat extract by reacting together a substantial cysteine-free amino acid component, a reducing sugar and a sulfonic acid component and product produced thereby.

This invention relates to a process for preparing seasonings, flavorings, condiments and the like having a taste remarkably similar to meat extract, and to the products so prepared.

Briefly, the process comprises reacting together amino acids, reducing sugars, and a sulfonic acid.

It is known that upon heating amino acids with reducing sugars the Maillard reaction (also called the "browning reaction") takes place, whereby not only brown-colored melanoidins are formed, but, depending upon the selection of the kind and quantity of reactants and the reaction conditions, various flavors (e.g. malt, caramel, chocolate, bread, potato) can be produced.

In recent years, a process for making a seasoning composition having a meat flavor has been proposed, comprising reacting cysteine (alone or in admixture with other amino acids or a protein hydrolyzate) with one or more reducing sugars. It has been believed that the presence of cysteine in the reaction mixture was necessary to the production of a product having a pronounced meat flavor.

We have now made the unexpected discovery that products having a pronounced meat flavor, which are practically indistinguishable from natural meat extract, can be prepared by reacting an amino acid other than cysteine, or a cysteine-free mixture of amino acids or protein hydrolyzate, with one or more reducing sugars, in the presence of a lower aminoalkanesulfonic acid or salt of such acid.

Preferably, from the standpoint of availability, the sulfonic acid component is taurine (aminoethylsulfonic acid, $NH_2 \cdot CH_2 \cdot CH_2 \cdot SO_3H$); taurine occurs naturally in many foodstuffs such as meat, fish and cheese, and is found in natural meat extract in the proportion of about 1.2% to 1.5% by weight, dry basis.

As amino acid component a single amino acid or its salt can be used; we have found glutamic acid and its salts (e.g. monosodiumglutamate) to be particularly effective. Also, mixtures of two or more amino acids (or salts) or a protein hydrolyzate (which is, of course, essentially a mixture of amino acids), can be used. Hydrolyzates of either animal or vegetable protein are effective in the process of the invention; we have used, for example, hydrolyzates of casein, meat flour, wheat gluten, corn gluten, and defatted soy grits with excellent results. The hydrolyzates can be prepared by any of the methods known in the art, e.g. by acid hydrolysis of the protein followed by neutralization, clarification and decolorization.

It should be emphasized that no cysteine is present in our reaction mixtures; despite the absence of the compound which has heretofore been thought to be essential to the development of a meat flavor, the products of our process have a pronounced, full-bodied meat flavor practically identical with that of natural meat extract.

The particular reducing sugar or sugars are not critical, but we prefer to use one or more pentoses or a mixture of one or more pentoses with one or more hexoses. The following sugars have been found eminently suitable: arabinose, dextrose, fructose, a lactose, ribose, and xylose.

The reaction should be conducted in an aqueous medium. Preferably, the ratio by weight) of sulfonic acid component to reducing sugar component is within the range of $\frac{1}{4}$ to $\frac{1}{3}$. The sulfonic acid component should be present in an amount between about 1% and 5% (by weight) of the total amino acid component plus the reducing sugar component. Preferably, the reaction is conducted at a temperature between about 60 and 110° C. and at a pH within the range of about 4 to about 7. The reaction should be conducted to completion, that is, until all of the reducing sugar component has been reacted. The end point can readily be determined by testing the reacted mixture for free reducing sugar.

Additional materials, particularly compounds which are present in natural meat extract such as succinic acid, lactic acid, and phosphates, can advantageously be added either before or after the reaction in order to "round off" the full-bodied flavor of the final product.

The products resulting from the reaction are in liquid form; they can be used as flavorings or seasoning in this form, or can be concentrated (as by evaporation) to pastes or dehydrated (as by vacuum- or spray-drying) to dry powders. The products have an excellent full-bodied meat flavor, practically identical to that of natural meat extract; when added to foodstuffs such as soup or food preparations containing meat or fish they impart a delicious meat flavor, and greatly enhance any meat flavors which are already present in the foodstuff.

The following examples will illustrate the practice of the invention. They are presented for illustrative purposes only, and are not intended to limit the scope of the invention.

Example 1

250 grams of a protein hydrolyzate (obtained by the acid hydrolysis of casein) having a dry substance content of 40% and a pH of 5 to 6 was mixed with 75 grams of monosodiumglutamate, 6 grams of xylose, 3.2 grams of taurine, and 120 grams of water. The mixture was heated to 90° C. and reacted at this temperature for 15 to 20 hours. After this period, the mixture was analyzed for free xylose, and none could be detected. The brown liquid resulting from the reaction had a pleasant taste similar to meat extract. The product was evaporated to a paste weighing 220 grams. The evaporation caused to deterioration in the flavor of the product.

Example 2

250 grams of a protein hydrolyzate (obtained by hydrolyzing wheat gluten) was mixed with 120 grams water, 2 grams xylose, 1 gram dextrose, and 2 grams taurine. The mixture was boiled for 5 hours under reflux. After this period, no reducing sugars could be detected in the mixture by analysis, indicating that the reaction had gone to completion. The product had a delicious meat flavor, barely distinguishable from natural meat extract. The product was then spray dried to a dry water-soluble powder. The dehydration had no adverse effect upon the flavor of the product.

Example 3

75 grams of sodium glutamate was dissolved in 90 ml. of water, and 3 grams arabinose, 3 grams dextrose, and 3.5 grams taurine were added to the solution. The reaction vessel was sealed and the contents heated to 110° C. for about 3 hours. The resultant liquid had a taste remarkably similar to natural meat extract.

Example 4

This example demonstrates the importance of sulfonic acid component to the development of a pronounced meat flavor, and also shows the advantages of adding additional materials which occur naturally in meat extract.

The following materials were added to 150 grams of water: 250 grams protein hydrolyzate (obtained from defatted soy grits), 45 grams potassium phosphate, 30 grams lactic acid, 3 grams succinic acid, 6 grams xylose, and 75 grams sodium glutamate. The solution was adjusted to a pH of about 5 to 7, and heated at 90° C., for about 20 hours. The product had a good, but mild, taste. The example was repeated except that 3.5 grams of taurine was added to the reaction mixture. The resultant product had a very pronounced full-bodied meat flavor, which was barely distinguishable from natural meat extract. The product was evaporated to obtain about 310 grams of paste; the evaporation had no adverse effect upon the delicious flavor.

Example 5

250 grams of a vegetable protein hydrolyzate, 75 grams glutamic acid, 3 grams ribose, 3 grams dextrose, 2.6 grams succinic acid and 3 grams taurine were dissolved in 200 grams of water. The solution was adjusted to a pH of about 6 and heated at 90° C. for about 20 hours. The reacted product was evaporated to the form of a paste (210 grams). The product had an excellent meat flavor.

We claim:

1. A process for the production of seasonings with a flavor similar to meat extract comprising reacting together under acidic conditions and at a temperature falling within the range of from about 60° C. to about 110° C., in an aqueous medium, the following components:

A substantially cysteine-free amino acid component selected from the group consisting of:
 amino acids;
 protein hydrolyzates;
 and mixture thereof;
a reducing sugar; and
a sulfonic acid component selected from the group consisting of:
 lower aminoalkanesulfonic acids;
 salts of lower aminoalkanesulfonic acids;
 and mixtures thereof;
said sulfonic acid component being present in an amount ranging from about 1% to about 5% by weight, based on the total weight of the amino acid component and the reducing sugar, with the ratio of said sulfonic acid component to said reducing sugar being from about 1/1 to 1/3 parts by weight until all of said reducing sugar component has been reacted.

2. The process of claim 1 wherein said amino acid component is glutamic acid.

3. The process of claim 1 wherein said amino acid component is a salt of glutamic acid.

4. The process of claim 1 wherein said amino acid component is a protein hydrolyzate.

5. The process of claim 1 wherein said reducing sugar is either a pentose or a mixture of a pentose and a hexose.

6. The process of claim 1 wherein said sulfonic acid component is taurine.

7. The process of claim 1 wherein additional ingredients which are present in natural meat extract are added to the mixture before or after reaction.

8. The process of claim 1 wherein said additional ingredients are selected from the group consisting of succinic acid, lactic acid, phosphates, and mixtures thereof.

9. The process of claim 1 which includes the additional step of concentrating the product resulting from the reaction to the form of a paste.

10. The process of claim 1 which includes the additional step of dehydrating the resultant reaction product to a dry powder.

11. A liquid seasoning having a flavor similar to meat extract prepared in accordance with the process of claim 1.

References Cited

UNITED STATES PATENTS

| 2,934,437 | 4/1960 | Morton et al. | 99—140 |
| 3,365,061 | 1/1968 | Berret | 99—140 |
| 3,394,015 | 7/1968 | Giacino | 99—140 |

MAURICE W. GREENSTEIN, Primary Examiner

H. H. KLARE III, Assistant Examiner

U.S. Cl. X.R.

99—14